United States Patent [19]
Whitney

[11] Patent Number: 5,320,031
[45] Date of Patent: Jun. 14, 1994

[54] FOOD PROCESSOR AND CONTAINER

[76] Inventor: Patrick T. Whitney, 560 Campbell St., Rochester, N.Y. 14611

[21] Appl. No.: 964,777

[22] Filed: Oct. 22, 1992

[51] Int. Cl.$^5$ .......................... A47J 19/06; B30B 9/02
[52] U.S. Cl. ......................................... 99/495; 99/458; 100/110; 100/116
[58] Field of Search ................ 99/495, 509, 510, 456, 99/458, 459, 460; 100/116, 213, 112, 132, 233, 234, 902, 110; D7/665, 666; 210/464, 470

[56] References Cited

U.S. PATENT DOCUMENTS

| | | | |
|---|---|---|---|
| 697,251 | 4/1902 | Hubbell | 100/116 |
| 755,126 | 3/1904 | Furst | 100/116 |
| 1,107,989 | 8/1914 | Oestreich | 100/116 |
| 1,319,373 | 10/1919 | Blaschke | 99/449 |
| 1,713,556 | 5/1929 | Ritchie | 100/110 X |
| 2,457,441 | 12/1948 | Branchfield, Sr. | |
| 3,785,281 | 1/1974 | Ligh | 100/116 |
| 3,995,544 | 12/1976 | Farley | |
| 4,355,574 | 10/1982 | Bond et al. | |
| 4,509,413 | 4/1985 | Granberg et al. | 99/459 |
| 4,860,647 | 8/1989 | Kerslake | |
| 5,148,951 | 9/1992 | Moure et al. | 100/116 |

FOREIGN PATENT DOCUMENTS

| | | | |
|---|---|---|---|
| 3910231 | 8/1989 | Fed. Rep. of Germany | 100/116 |
| 1717092 | 3/1992 | U.S.S.R. | 100/116 |

Primary Examiner—Timothy F. Simone
Attorney, Agent, or Firm—Cumpston & Shaw

[57] ABSTRACT

A food processing utensil for straining the liquid from food packed in a liquid and for storage of the food product once the liquid is drained therefrom and the method for using the utensil are disclosed. The plastic utensil includes a cylindrical container open at the top and bottom; a set of lids comprising a top lid and a bottom lid which can be press fit onto the container to seal the container; a strainer releasably engageable with either the top or bottom opening of the container wherein the strainer has an end wall further having perforations for the passage of liquid, and a sleeve for releasably engaging an open can, such as a can of tuna fish, for collecting the drained liquid; and, a plunger slidably receivable into the container for contacting the food in the container. A lid is snapped onto an open end of the container and a food product with associated liquid is introduced therein. The strainer is then snapped onto the open end whereupon the utensil is inverted and set atop the open, empty food container. The first lid is removed and a plunger is used to compress the food product while the liquid portion drains through the strainer and into the empty food can. The plunger is removed and the lid is reattached, whereupon the utensil is removed from the can, the strainer removed from the utensil, and the remaining lid snapped onto the container.

17 Claims, 4 Drawing Sheets

FOOD PROCESSOR AND CONTAINER

BACKGROUND OF THE INVENTION

1. Field of the Invention

This invention relates generally to food processing and, in particular, to a food processing utensil and the method for using it for draining the liquid from a solid food product packed in a liquid medium and for storing the drained food in the utensil.

2. Statement of the Related Art

Certain canned food products, for example, tuna fish, consist of a solid food product packed in a liquid medium. Such liquid mediums are typically water or oil. The preparation of such products preferably entails the draining or straining of the liquid from the solid portion so that the liquid can be discarded and the solid portion prepared to one's taste. As is frequently done upon opening of the canned food product, the user then typically applies force to the lid while holding the can upside down to drain the liquid from the can. This often results in the liquid squirting from the can or dripping into areas not intended for such liquid, and exposes the user to the sharp lid edge.

Accordingly, there is a need for a functional, simple, and inexpensive device which facilitates the removal of the liquid from a canned food product packed in such liquid.

U.S. Pat. No. 3,995,544 describes a tuna squeezer and strainer utensil that is useful for the separation of liquid from subdivided solid comestibles, such as canned tuna and the like. The device comprises a generally cupped shaped member having a cylindrical wall conforming to the internal diameter of a standard can size and an end, circular wall which is perforated to provide permeability to liquid while blocking passage of subdivided solid comestibles. The side walls of the cupped shaped member distally support tabs which project radially outward from the side walls so that the user may grasp the press after it has been inserted into a can, and upon inverting the can and press, proceed to drain the liquid therefrom.

U.S. Pat. No. 4,355,574 discloses a tong or scissors like device having a disk depending transversely from one of the scissors ends which allows for the holding and draining of a standard size tuna fish type can container.

U.S. Pat. No. 4,860,647 to Kerslake discloses a can draining implement which consists of two handles pivotably attached together. One handle has a can supporting plate which faces a plunger on the other handle. The plunger has an angled face designed to cause liquid being drained from the can to flow to one side. Furthermore, the plunger has embedded therein a magnet designed to hold the lid of the can after draining has been accomplished.

Each of these devices requires that the opened can remain filled with the food product as the liquid is drained therefrom. In addition, the method of using each of the devices described above requires a disposal for the drained liquid that is separate from the food product container itself.

SUMMARY OF THE INVENTION

The present invention is a practical, convenient and inexpensive utensil for processing canned solid food which is packed in a liquid medium, and for storing the solid food until consumed or discarded. The device allows the user to drain the often odoriferous and stain producing oil or water from canned food, such as tuna or pilchard, without the liquid squirting or dripping where it is not intended.

The device generally consists of a hollow right circular cylindrical container manufactured, as all of the parts of the utensil are, from molded polyolefin; for example, polyethylene, polypropylene, etc. and formed by conventional injection molding techniques. The utensil further comprises an upper and lower lid, a strainer, and a plunger. In use, the upper lid is press snapped over the upper open end of the cylindrical container section. The cylinder container is then inverted so as to sit on the lid just snapped on, and the now open end of the cylinder container is ready to accept the liquid and solid contents of a canned food product such as tuna fish. Having emptied the food product into the cylinder, the user then press-snaps the strainer component onto the open end of the cylinder. The utensil is quickly inverted and set atop the open and now empty food product container, with the short, annular sleeve of the strainer section allowing positive, centered contact of the utensil with an open standard size #6 can, whereupon the first lid covering the cylinder container is removed and the plunger component telescopically inserted into the container section. Force is applied to the plunger base via a graspable handle extending from the base. The liquid from the food product passes through apertures in the end wall of the strainer and is collected into the empty original food container. The plunger is then removed, the upper lid or cover reattached to the cylinder container, and the utensil including the strainer section is lifted off of the food container and inverted. The strainer component is removed from the container section and mayonnaise and/or other seasonings can be added directly to the drained food product to suit the consumer's taste. Alternatively, the food product may be simply stored. A second lid, identical in construction to the first lid, is press-snapped on to the top of the cylinder container as the utensil now acts as a holding container for the food product. The drained liquid is conveniently collected in the original food container and can be disposed of as selected.

It is thus an object of the present invention to provide a utensil which permits improved means by which to separate the liquid from the solid food portion of a canned food product, such as tuna fish.

It is a further object of the invention to provide a food processing utensil having press-snap lids which allow the utensil to act as a storage container for the food once the liquid has been removed.

It is still a further object of the invention to provide a food processing utensil for separating the liquid from the solid portion of a canned food product which makes use of the original food container as the receptacle for collecting the drained and unwanted liquid portion.

These and other objects, features and aspects of the present invention will be understood from the following detailed description when it is read in conjunction with the drawings and the appended claims.

DETAILED DESCRIPTION OF THE PREFERRED EMBODIMENT

Figure 1:
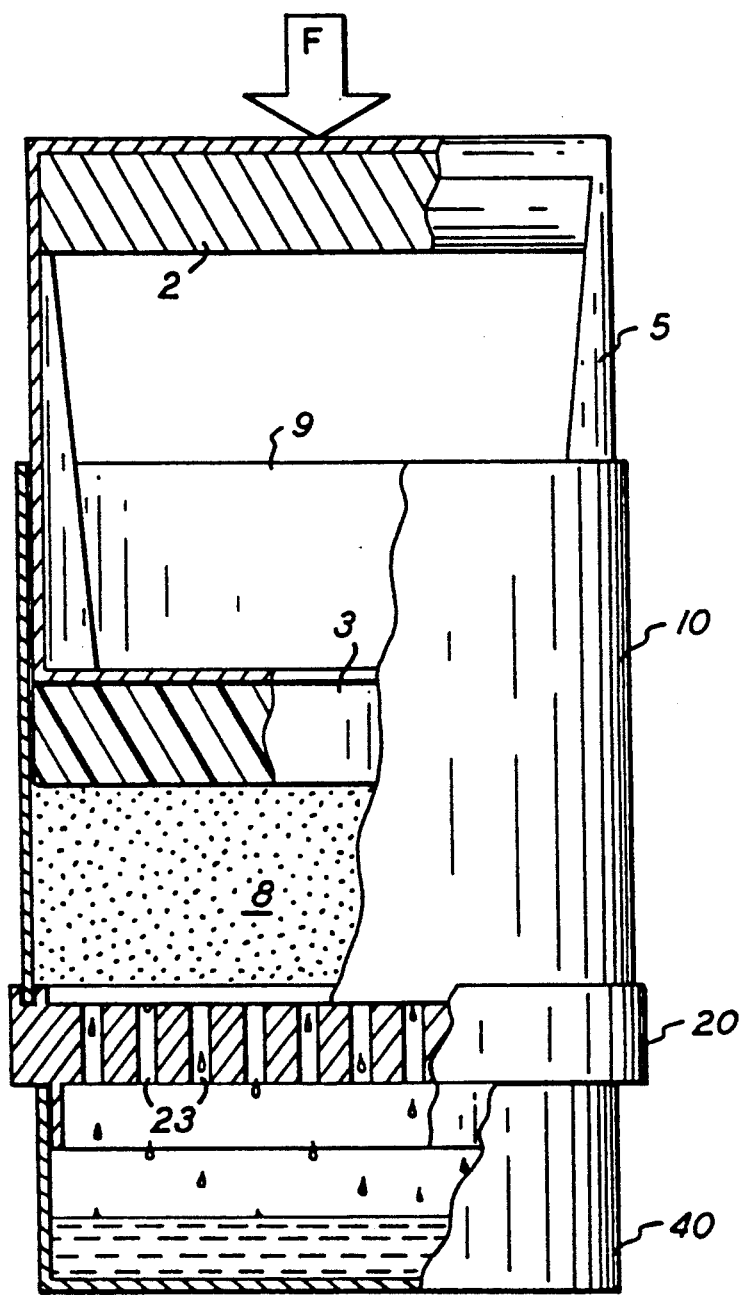
FIG. 1 is a cross-sectional elevational view of the food processor as it would appear in use.

Referring first to FIG. 1, container 10 is a right circular cylinder having open top end 9 and open bottom end 8. FIG. 1 depicts the utensil in proposed use showing container 10 with attached strainer 20 and plunger 5 sitting atop an empty food product container 40 for collecting the liquid passing through apertures 23.

Figure 2:
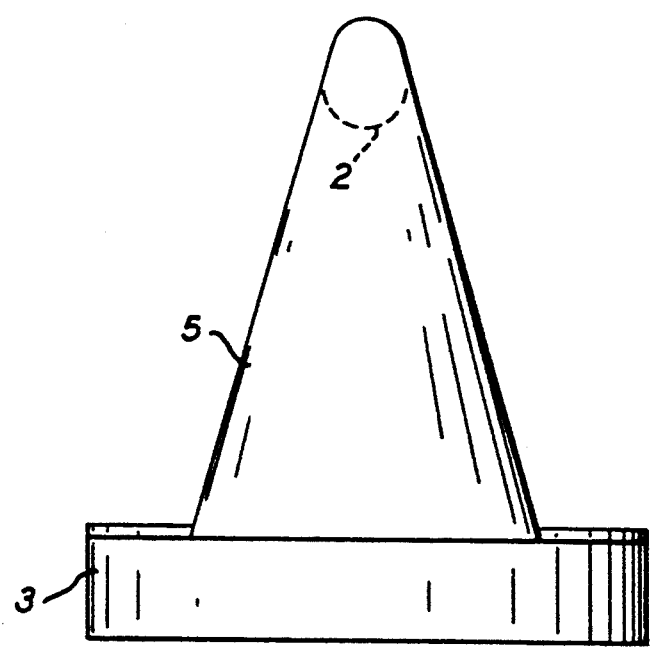
FIG. 2 is an elevational view of the plunger.
Figure 3:
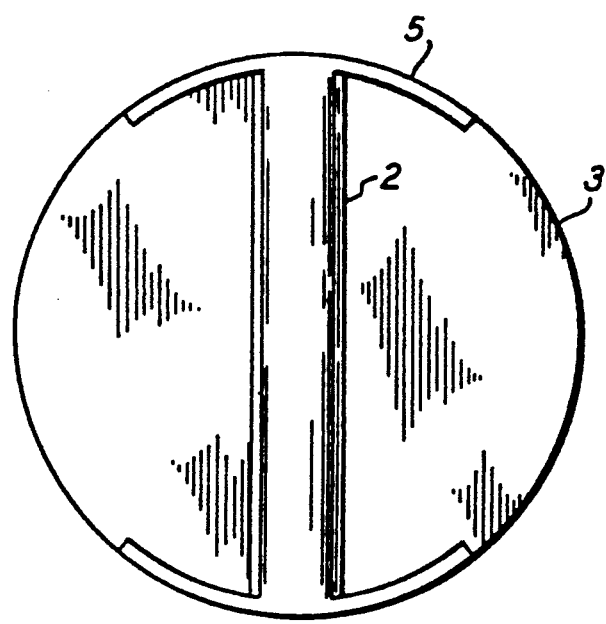
FIG. 3 is a top view of the plunger.

With reference to FIG. 2, a plunger 5 is shown having right circular base 3 and graspable handle 2.

Figure 4:
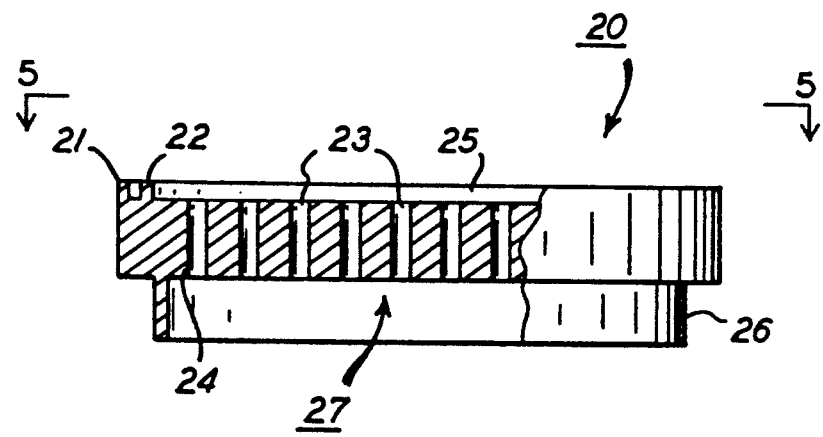
FIG. 4 is a cross-sectional view of the strainer.
Figure 5:
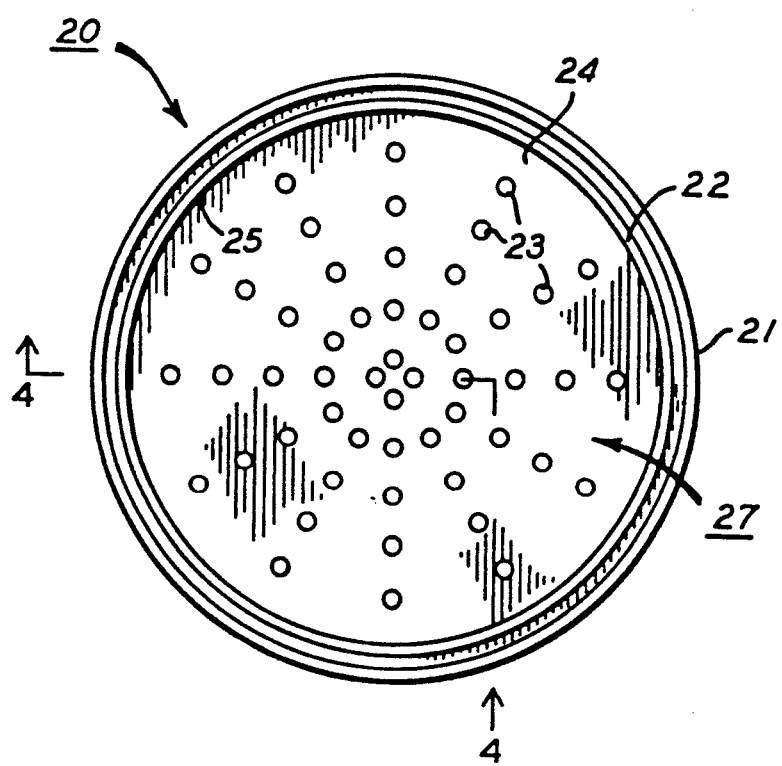
FIG. 5 is a top view of the strainer.

FIGS. 4 and 5 depict strainer 20 and show, among other things, lips 21,22 for friction press-snapping strainer 20 onto open end 8 of container 10. Strainer 20 additionally comprises end wall 25 which further comprises solid outer annular flange 24, apertures 23, and annular sleeve 26, all integrally forming a drainage section 27.

Figure 6:
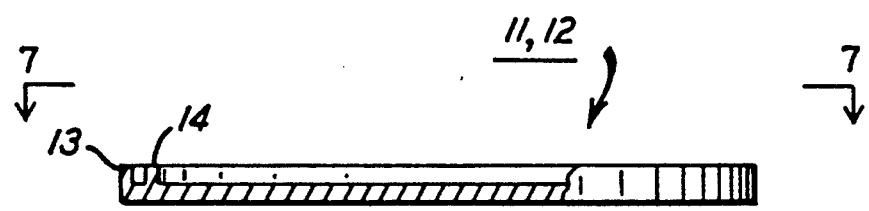
FIG. 6 is a cross-sectional view of the lids.
Figure 7:
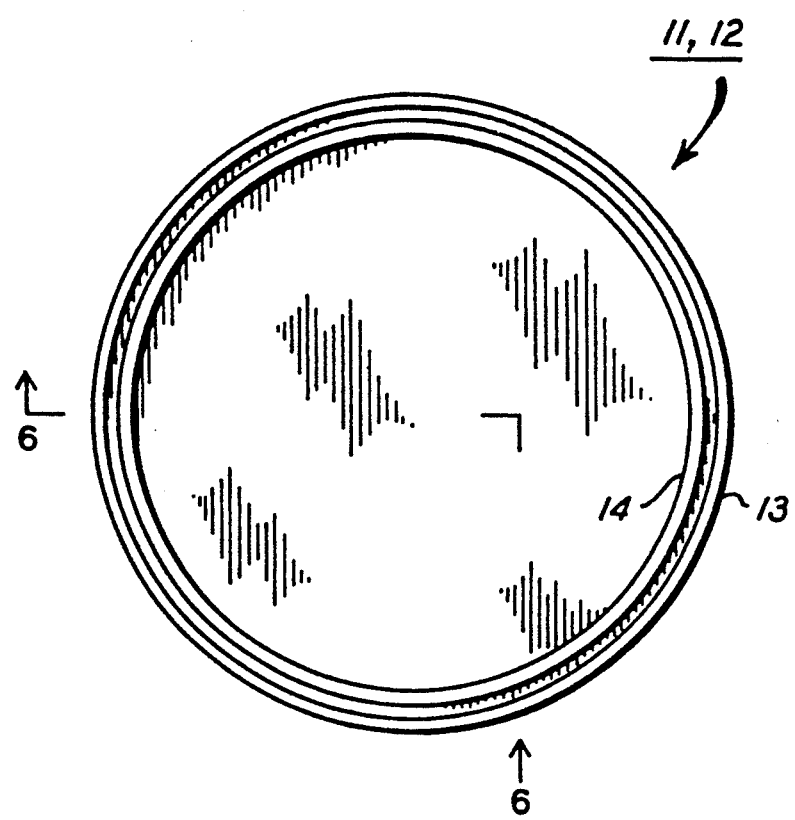
FIG. 7 is a top view of the press-snap container lids.

FIGS. 6 and 7 show container lids 11,12 with their flexible lip sections 13,14 for press-snapped friction fit onto container 10.

Referring to the figures, a top open end 9 of the right circular cylindrical container 10 is covered with top lid 11. Top lid 11 has inner lip 14 and outer lip 13 which allow lid 11 to be fitted over the open container end by press-snapping lid 11 against the container rim to form a leak proof seal.

Container 10 with lid 11 attached is overturned so that open end 8 faces upward. The liquid and solid contents of a canned food product requiring drainage are emptied into container 10 whereupon strainer 20 is press-snapped over the open end 8 of container 10 to form a seal-seating relation. Strainer 20 has inner and outer lip sections 21,22 which allow positive connecting contact between strainer 20 and container 10. Strainer 20 includes end wall 25 which integrally comprises a solid annular flange section 24, a perforated drainage section 27 containing a plurality of apertures 23, and an annular sleeve section 26 which depends downward from end wall 25 at the inner diameter of flange section 24.

Once the strainer 20 is press-snapped onto the open rim of container 10, the apparatus thus assembled is again turned over so that sleeve 26 of strainer 20 telescopically fits into the empty #6 food product container. Lid 11 is then removed and, with reference to FIGS. 1 and 2, plunger 5 having a right circular cylindrical base 3 and graspable handle section 2 is telescopically inserted into container 10, handle 2 providing convenient means for exerting a downward force F against the contents of container 10.

After the desired amount of liquid has been drained, plunger 5 is withdrawn and lid 11 is again press-snapped onto the open container 10. The apparatus as assembled is lifted from the food container bearing the drained liquid and again inverted so that strainer 20 can be removed. In this condition the food product in container 10 can be seasoned or prepared as desired and consumed, or, alternatively, stored by press-snapping lid 12 onto the container.

Accordingly, an invention for a food processor-storage container is disclosed in the form of a preferred embodiment thereof. The invention is not to be limited solely to the above description but is intended to encompass such equivalents known to those skilled in the art as set forth in the claims to follow.

What is claimed is:

1. A food processing utensil for draining a liquid from a solid food product packed in a can in the liquid, and for storing the solid food in the utensil, comprising:
   (a) a container having a top open container end fluidly connected to a bottom open container end;
   (b) a set of identical lids comprising a top lid and a bottom lid each having engagement means for sealingly engaging the top and bottom open container ends;
   (c) a strainer releasably engageable to one of the top and the bottom open container ends; and
   (d) a plunger slidably receivable within one of the top and the bottom open container ends for compressing the food product in the container.

2. The food processing utensil of claim 1 wherein the container, lids, plunger and strainer are injection molded plastic.

3. The utensil of claim 1 wherein the container is a right circular cylindrical container.

4. The utensil of claim 1 wherein the lid engagement means for both lids comprise an outer annular lip and an inner annular lip both depending from the surface of each lid, wherein the lips form a groove for sealingly engaging one of the top and the bottom open container ends, by each of the lids.

5. The utensil of claim 1 wherein the strainer comprises a circular disk having a plurality of perforations in its surface for fluid passage; further comprising an inner and outer annular lip for snapably engaging one of the top and the bottom open container ends, and further comprising an annular sleeve depending from the disk on a side opposite to the strainer lips, wherein the annular sleeve slidably engages an open food product container at its inner perimeter.

6. The utensil of claim 5 wherein the perforations comprise a plurality of apertures each having a diameter greater than approximately 0.03 inches and less than approximately 0.20 inches.

7. The utensil of claim 1 wherein the plunger comprises a base portion and a graspable handle wherein the base portion further comprises a solid circular disk which is attached to the handle by integral support means for slidably engaging the plunger in the container.

8. A food processing utensil for draining a liquid from a solid food product packed in a can in the liquid, and for storing the solid food in the utensil, comprising:
   (a) a container having a top open container end fluidly connected to a bottom open container end;
   (b) a top lid and a bottom lid, being identical in construction and each having an outer annular lip and an inner annular lip depending from a lid surface wherein the lips form a groove for sealingly engaging the top and bottom open container ends by each of the lids;
   (c) a strainer releasably engageable to one of the top and the bottom open container ends; and
   (d) a plunger slidably receivable within one of the top open end and the bottom open end of the container for compressing the food product in the container.

9. The utensil of claim 8 wherein the container is a right circular cylindrical container.

10. The utensil of claim 8 wherein the perforations comprises a plurality of apertures each having a diameter greater than approximately 0.03 inches and less than approximately 0.20 inches.

11. The utensil of claim 8 wherein the plunger comprises a base portion and a graspable handle wherein the base portion further comprises a solid circular disk which is attached to the handle by integral support means for slidably engaging the plunger in the container.

12. The utensil of claim 10 wherein the container, lids, plunger and strainer are injection molded plastic.

13. A food processing utensil for draining a liquid from a solid food product packed in a can in the liquid, and for storing the solid food in the utensil, comprising:
   (a) a container having a top open container end fluidly connected to a bottom open container end;
   (b) a top lid and a bottom lid, being identical in structure and each having engagement means for sealingly engaging the top and bottom open container ends by each of the lids;
   (c) a strainer releasably engageable to one of the top or the bottom open ends of the container, the strainer comprising a circular disc having perforations in its surface for fluid passage; an inner and an outer annular lip depending from a side of the disc for snapably engaging one of the top and bottom open ends of the container, and an annular sleeve depending from the disc on a side opposite to the side having the strainer lips, wherein the annular sleeve slidably engages an open food product container at its inner perimeter; and
   (d) a plunger slidably receivable within one of the top and bottom open ends of the container for compressing the food product in the container.

14. The utensil of claim 13 wherein the container is a right circular cylindrical container.

15. The utensil of claim 13 wherein the perforations comprises a plurality of apertures each having a diameter greater than approximately 0.03 inches and less than approximately 0.2 inches.

16. The utensil of claim 13 wherein the plunger comprises a base portion and a graspable handle wherein the base portion further comprises a solid circular disk which is attached to the handle by integral support means for slidably engaging the plunger in the container.

17. The utensil of claim 13 wherein the container, lids, plunger and strainer are injection molded plastic.

* * * * *